(12) United States Patent
Gissing et al.

(10) Patent No.: US 8,429,832 B2
(45) Date of Patent: Apr. 30, 2013

(54) UTILIZATION OF WASTE HEAT IN THE DRYER SECTION OF PAPER MACHINES

(75) Inventors: Klaus Gissing, Judendorf-Strassengel (AT); Wolfgang Promitzer, Graz (AT)

(73) Assignee: Andritz AG, Graz (AT)

( * ) Notice: Subject to any disclaimer, the term of this patent is extended or adjusted under 35 U.S.C. 154(b) by 720 days.

(21) Appl. No.: 12/321,928

(22) Filed: Jan. 27, 2009

(65) Prior Publication Data

US 2009/0188128 A1    Jul. 30, 2009

(30) Foreign Application Priority Data

Jan. 29, 2008   (AT) .................. A 128/2008

(51) Int. Cl.
*F26B 3/00*      (2006.01)
*F26B 21/06*     (2006.01)
*F26B 11/02*     (2006.01)
*F28B 3/00*      (2006.01)

(52) U.S. Cl.
USPC ................... 34/514; 34/79; 34/140; 165/112

(58) Field of Classification Search .................. 34/514, 34/79, 140, 86; 165/110–114
See application file for complete search history.

(56) References Cited

U.S. PATENT DOCUMENTS

| | | | | |
|---|---|---|---|---|
| 4,214,450 A | * | 7/1980 | Nagashima et al. | 60/648 |
| 4,522,035 A | | 6/1985 | Dyer et al. | 62/79 |
| 4,968,787 A | * | 11/1990 | Inada et al. | 536/18.5 |
| 5,027,601 A | * | 7/1991 | Yoshida et al. | 60/641.5 |
| 6,470,595 B1 | * | 10/2002 | Gaiser et al. | 34/359 |
| 6,576,805 B2 | * | 6/2003 | Keady et al. | 585/802 |
| 2007/0209769 A1 | * | 9/2007 | Nogami et al. | 162/207 |
| 2009/0223053 A1 | * | 9/2009 | Gandy et al. | 29/890.031 |
| 2010/0021977 A1 | * | 1/2010 | May et al. | 435/135 |

FOREIGN PATENT DOCUMENTS

| | | |
|---|---|---|
| DE | 35 01 584 | 1/1985 |
| DE | 3501584 A * | 8/1985 |
| GB | 2 155 164 | 9/1985 |

* cited by examiner

*Primary Examiner* — Kenneth Rinehart
*Assistant Examiner* — John McCormack
(74) *Attorney, Agent, or Firm* — Alix, Yale & Ristas, LLP

(57) ABSTRACT

A process and a device for utilization of waste heat from a high-temperature hood in the dryer section of a paper machine. The waste heat from the high-temperature hood is applied to the waste steam and the condensate, respectively, from a steam system by means of a heat exchanger, thus improving utilization of the energy contained in the exhaust air from a high temperature hood.

15 Claims, 2 Drawing Sheets

UTILIZATION OF WASTE HEAT IN THE DRYER SECTION OF PAPER MACHINES

BACKGROUND

The invention relates to a process for utilization of waste heat from a high-temperature hood in the dryer section of a paper machine, as well as a suitable device for implementing the process.

This process and device is intended to improve utilization of the energy contained in the exhaust air from a high-temperature hood.

The dryer section of a paper machine consists of a steam-heated dryer and a high-temperature hood heated by steam or gas and located above the dryer. The dryer is generally operated with steam pressures between 1 and 10 bar, and the blow-air temperature of the high-temperature hood is usually between 250° C. and 700° C. In principle, utilizing the waste heat from the blow air of a high-temperature hood in stages is state-of-the-art. It mainly heats supply air and combustion air, as well as heating water and process water. DE 3501584 also describes a device with which the waste heat from the blow air of a high-temperature hood can be used to generate steam. Here, the condensate collecting in the dryer is brought from a steam separator into a heat exchanger for waste heat from the high-temperature hood, where it evaporates due to the energy content of the exhaust air from the high-temperature hood. Subsequently, the steam thus generated is fed again to the dryer.

This known heat recovery process has the disadvantage that the condensate fed through the heat exchanger must always be measured such that the condensate is guaranteed to evaporate completely in the exchanger or after any reduction in pressure. Thus, when controlling the flow of condensate through the heat exchanger it is essential to take the evaporating capacity of the heat exchanger into account; this leads to regulating problems if there are fluctuations in the temperature of the exhaust air from hood.

SUMMARY

The problem thus addressed by the present invention is to provide an improved heat recovery process that is easier to regulate, which avoids the above mentioned disadvantages and makes better use of the waste heat from the exhaust air. In addition, the invention relates to an appropriate device with which this improved heat recovery process is performed.

This problem is solved by a heat recovery process in which waste steam from a steam system is fed to a steam separator and part of the condensate from the steam separator is returned to the steam separator via a heat exchanger in a separate loop, where the heat in the exhaust air from the high-temperature hood is applied to the condensate via the heat exchanger.

The waste steam need not come from a dryer in the dryer section, but may also originate from other processes in which steam is needed.

Heat recovery by means of a separate condensate loop has the advantage that the flow of condensate through the heat exchanger of the high-temperature hood to the dryer or to other units can be controlled independently of the steam supply. Returning the condensate pipe to the steam separator after the heat exchanger has the further advantage that it is not necessary to evaporate the condensate entirely because condensate that has not evaporated is simply returned to the heat exchanger one more time, thus the waste heat in the exhaust air from the high-temperature hood can be put to optimum use to generate steam.

In a favorable embodiment of the process, the waste steam is taken from the steam-heated dryer, thus the waste heat from the high-temperature hood can be used directly to generate steam.

As an alternative, it is also conceivable, of course, to take the waste steam for the heat recovery process from a separate steam system.

It is an advantage if the pressure in the heat exchanger is greater than the pressure in the steam separator as this can ensure that the condensate does not evaporate until it is returned to the steam separator. Here, it is beneficial if the pressure in the heat exchanger is 15 to 25 bar and the pressure in the steam separator is 5 to 10 bar.

It is expedient if a further part of the condensate is discharged from the steam separator and fed to a boiler for steam generating. This prevents too much condensate collecting in the steam separator if the heat exchanger has too little evaporating capacity.

It is particularly advantageous if the mass flow of the condensate that is fed through the heat exchanger is greater than the mass flow of the condensate that is fed to the boiler. The larger mass flow through the heat exchanger permits improved us of waste heat.

A further subject of the invention is a device for utilizing the waste heat from a high-temperature hood, where a steam separator is connected to the beginning and the end of a condensate circulating pipe, and there is a heat exchanger connected to the exhaust air pipe from the high-temperature hood inside this condensate circulating pipe. By conveying the condensate in a separate circulation system, heat recovery can be controlled independently of the steam feed.

In an advantageous embodiment the steam separator is arranged after the dryer, thus the waste heat from the hood exhaust air can be used to generate steam for the dryer.

As an alternative, the steam separator can also be connected to a separate steam system. The steam generated can be used here for heating purposes in the stock preparation process or to operate a steam blow box. This permits improved utilization of the waste heat from the high-temperature hood for further units that require steam.

In a favorable embodiment of the device for utilization of the waste heat from a higher-temperature hood, a compressor is located ahead of the heat exchanger and a pressure-reducing valve being located after the heat exchanger in the condensate circulating pipe. With this arrangement, the condensate does not evaporate until after the heat exchanger.

It is useful if the heat exchanger is designed as a tubular heat exchanger as this permits a compact design.

BRIEF DESCRIPTION OF THE DRAWING

Embodiments of the invention are described below with reference to the accompanying drawing in which.

DETAILED DESCRIPTION

Figure 1:
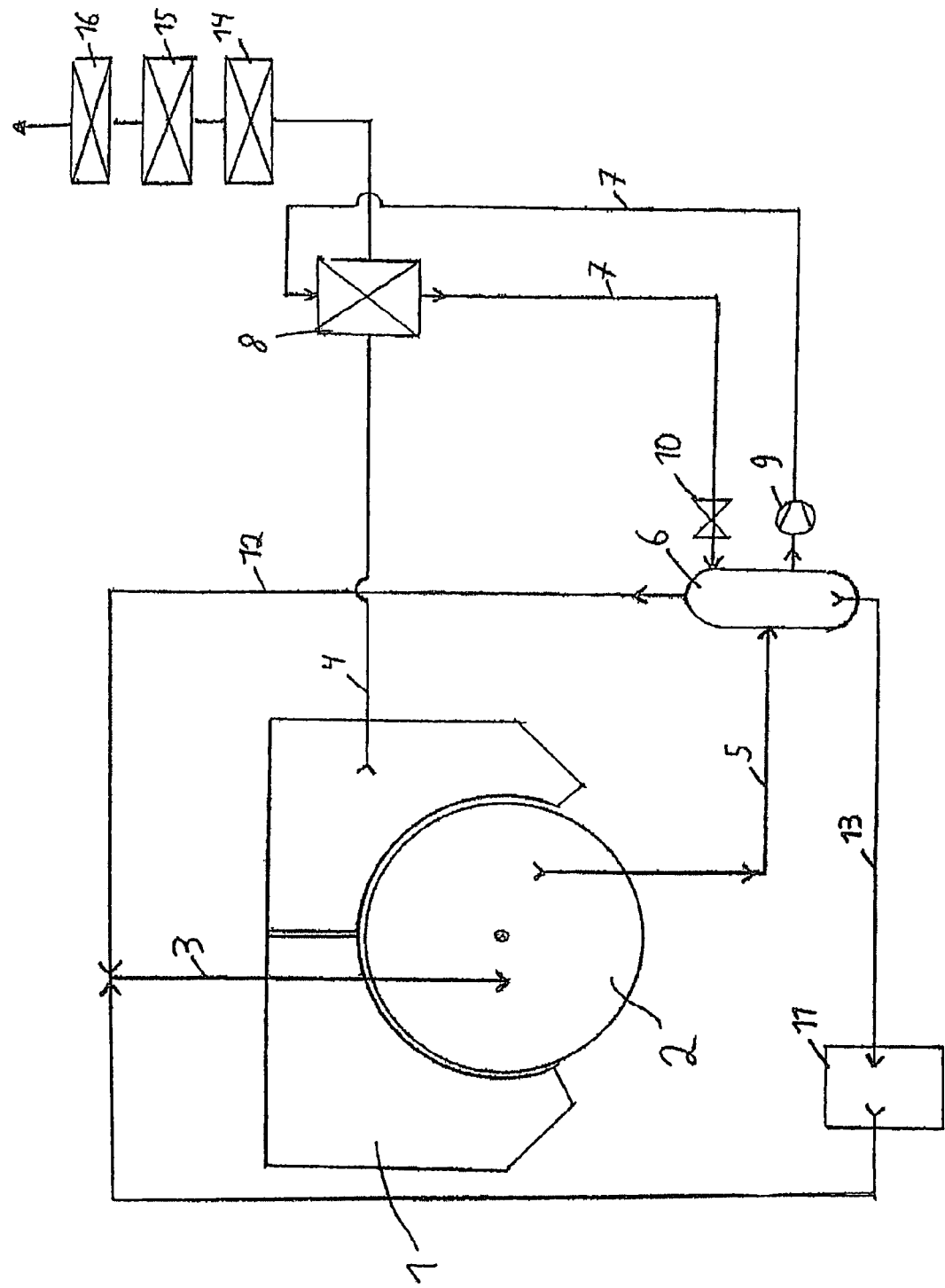
FIG. 1 is a schematic general view of a device according to one embodiment for utilizing the waste heat from a high-temperature hood.

As can be seen in FIG. 1, a high-temperature hood 1 mounted round a dryer 2 is used for the dryer section of a paper machine. The paper web runs round the dryer 2, which is heated by means of steam via the fresh steam pipe 3. The moisture contained in the material web is absorbed by the blow air introduced through the high-temperature hood 1 and carried off through the exhaust air pipe 4. From the dryer 2, an exhaust steam pipe 5 leads to a steam separator 6, in which steam and condensate are separated.

Part of the condensate in the steam separator 6 is circulated by means of a condensate circulating pipe 7. This condensate circulating pipe 7 contains a heat exchanger 8, which is heated via the exhaust air pipe 4 of the high-temperature hood 1. The condensate circulating pipe 7 also contains a compressor 9 after the steam separator 6 and a pressure reducing valve 10 after the heat exchanger 8.

Steam removed in the steam separator is returned to the dryer 2 again via the steam discharge pipe 12 and the fresh steam pipe 3. Part of the condensate from the steam separator 6 is fed through the condensate discharge pipe 13 to a boiler 11 to generate steam; this steam can then be fed to the dryer 2 again through the fresh steam pipe 3.

During operation, part of the condensate from the steam separator 6 is circulated via the condensate circulating pipe 7 through the heat exchanger 8. The compressor 9 and the pressure reducing valve 10 provide for higher condensate pressure in the heat exchanger 8 than in the steam separator 6. This prevents the condensate from evaporating in the heat exchanger 8. As soon as the condensate heated by the heat exchanger 8 flows through the pressure reducing valve 10 into the steam separator 6, it evaporates at least partly. The steam thus newly generated is fed together with the steam removed in the steam separator 6 through the steam discharge pipe 12 to the dryer 2. After the heat exchanger 8, the exhaust air from the high-temperature hood 1 can be fed to further heat exchangers 14, 15, and 16, where combustion air, heating water and process water are heated by the residual heat in the exhaust air. The heat exchanger 8 is preferably a tubular heat exchanger.

Figure 2:
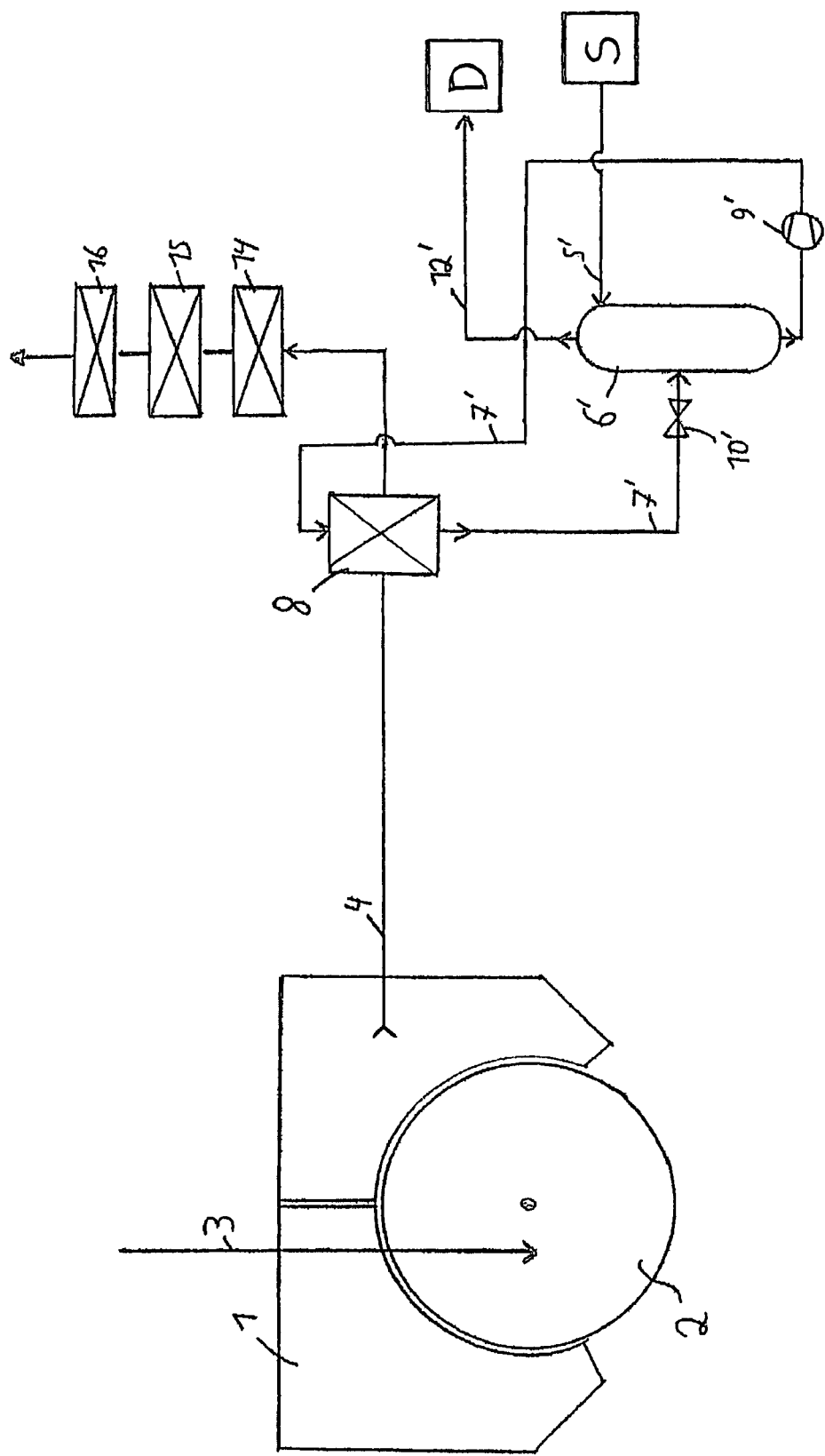
FIG. 2 a schematic general view of another embodiment of the invention.

FIG. 2 shows a further embodiment of the invention, using the same reference numerals as in FIG. 1. In this variant, heat from the exhaust air of the high-temperature hood 1 is fed to a separate steam system.

The waste steam from a separate stream system is fed through the waste steam pipe 5' to a steam separator 6'. Condensate from the steam separator 6' is circulated through the heat exchanger 8 is a condensate circulating pipe 7'. The heat exchanger 8 is heated by the exhaust air from the high-temperature hood 1, thus heat is applied to the condensate in the condensate circulating pipe 7'. The compressor 9' and the pressure reducing valve 10' in the condensate circulating pipe 7' ensure that the pressure in the heat exchanger 8 is higher than in the steam separator 6'. Steam removed in the steam separator 6' and fresh steam generated by applying heat in the heat exchanger 8 are fed to the separate steam system. This can be a steam blow box or a heating element in the stock preparation system, or other device indicated at "D". The source of exhaust steam from any other device in the system is indicated at "S".

The embodiments shown in the drawings merely represent preferred embodiments of the invention. The invention also comprises other embodiments in which, for example, the condensate in the condensate pipe 13 is not fed to a boiler 11 to generate steam, but to other processes using either the waste steam contained in the condensate or the condensate itself.

The invention claimed is:

1. Process for heat recovery in a dryer section of a paper machine, where a paper web is dried with a steam-heated dryer (2) and a high-temperature hood (1) supplied with hot air, comprising:
 supplying waste steam (5, 5') from a steam system to a steam separator (6, 6'), where steam is separated from condensate;
 passing at least a part of the condensate through a heat exchanger (8);
 heating and increasing the temperature of the condensate in the heat exchanger by transferring heat from exhaust air (4) of the high temperature hood (1) passing through the heat exchanger; and
 returning the heated condensate as steam to the steam separator (6, 6');
 wherein the steam separator (6, 6') is at a pressure and the heat exchanger (8) is at a pressure greater than the pressure in the steam separator, whereby the condensate does not evaporate in the heat exchanger.

2. Process according to claim 1, wherein the waste steam for the steam separator is taken from the steam-heated dryer (2).

3. Process according to claim 2, wherein the waste steam for the steam separator (6, 6') is taken from a separate steam system.

4. Process according to claim 1, wherein the pressure in the heat exchanger (8) is 15 to 25 bar.

5. Process according to claim 1, wherein the pressure in the steam separator (6, 6') is 5 to 10 bar.

6. Process according to claim 5, wherein the pressure in the heat exchanger (8) is 15 to 25 bar.

7. Process according to claim 1, wherein part of the condensate is discharged from the steam separator (6, 6') and fed to a boiler (11) for generating steam.

8. Process according to claim 7, wherein a larger mass flow of condensate is passed through the heat exchanger (8) than is fed to the boiler (11).

9. A system for utilization of waste heat comprising:
 a steam-heated dryer (2);
 a high temperature hood (1) for the dryer, supplied with hot air;
 an exhaust air conduit (4) from the hood;
 a conduit (5, 5') from a source of exhaust steam;
 a steam separator (6, 6') connected to receive exhaust steam from the exhaust conduit (5, 5'), remove moisture from the exhaust steam as a condensate to a condensate discharge conduit, and discharge separated steam through a steam discharge conduit (12, 12');
 wherein said steam separator (6, 6') and condensate discharge conduit are in a distinct circulation loop (7, 7') that begins and ends with the steam separator and includes a heat exchanger (8) that receives condensate from the condensate discharge conduit and is connected to the exhaust air pipe (4) from the high-temperature hood (1); and
 a compressor (9) located ahead of the heat exchanger (8) and a pressure reducing valve (10) located after the heat exchanger (8) in the circulation loop (7, 7') whereby the condensate is prevented from evaporating in the heat exchanger.

10. The system according to claim 9, wherein the steam separator (6, 6') is connected to the dryer (2) and arranged after the dryer (2).

11. The system according to claim 9, wherein the steam separator (6, 6') is connected to deliver steam to a separate steam system.

12. The system according to claim 11, wherein the separate steam system comprises a facility for stock preparation.

13. The system according to claim 11, wherein the steam separator (6, 6') is connected to a steam blow box.

14. The system according to claim 9, wherein the heat exchanger (8) is a tubular heat exchanger.

15. A system for utilization of waste heat comprising:
   a steam-heated dryer (2);
   an exhaust conduit (5) from the dryer;
   a high temperature hood (1) for the dryer, supplied with hot air;
   an exhaust conduit (4) from the hood (1);
   a steam separator (6, 6') connected to receive exhaust steam from the dryer exhaust conduit (5), remove moisture from the exhaust steam as a condensate and supply a first portion of the condensate to a first condensate pipe (13) in a first loop that returns heated condensate to the dryer, and returns separated steam to the dryer through a steam discharge pipe (12);
   said steam separator (6, 6') supplying a second portion of the condensate through a distinct second condensate pipe in a distinct second condensate circulation loop (7, 7') including a heat exchanger (8) that is connected to the exhaust air pipe (4) from the high-temperature hood (1) and a return line from the heat exchanger to the steam separator; and
   a compressor (9) located ahead of the heat exchanger (8) and a pressure reducing valve (10) located after the heat exchanger (8) in the second circulation loop (7, 7') whereby the condensate is prevented from evaporating in the heat exchanger in the second circulation loop.

\* \* \* \* \*